Patented June 30, 1953

2,643,984

UNITED STATES PATENT OFFICE 2,643,984

AMINOPLASTS MODIFIED WITH TITANIUM POLYMERS

Thomas Boyd, Springfield, Mass., assignor to Monsanto Chemical Company, St. Louis, Mo., a corporation of Delaware No Drawing. Application February 9, 1950, Serial No. 143,349

9 Claims. (Cl. 260—45.2)

This invention relates to modified aminoplasts. More particularly, the invention relates to aminoplasts modified with polymers of organic titanium compounds.

An object of this invention is to provide new aminoplast compositions.

A further object is to provide fast curing aminoplast compositions.

Another object is to provide aminoplast compositions which may be cured rapidly without the use of a curing catalyst.

Still another object is to provide cured aminoplast compositions having enhanced heat and moisture resistance.

These and other objects are attained by modifying aminoplast compositions with polymers of organic titanium compounds.

The following examples are given in illustration and are not intended as limitations on the scope of this invention. Where parts are mentioned they are parts by weight.

Example I

A coating composition was prepared by dissolving equal parts by weight of a fusible soluble butylated methylol melamine condensation product and a polymeric tetrabutyl ortho titanate in a mixture of xylol and butanol so that the resulting composition contained about 50% solids by weight. A coating of this composition about 0.005 inch thick was spread on a sheet steel panel. The coated panel was then heated at about 105° C. for about 20 minutes to cure the coating. The cured films were clear, colorless and hard. The solubility of the cured coating was tested by immersing the coated panel in benzene for about five minutes. No dissolution or swelling of the film was noted. A cured film of an unmodified butylated methylol melamine dissolved in benzene in five minutes.

Example II

A coating composition was prepared containing 3 parts of a butylated methylol melamine in the soluble and fusible stage and one part of polymeric tetrabutyl ortho titanate. The composition contained about 50% solids in xylol-butanol solution. When coated on steel panels and cured at about 105° C. for about 20 minutes, clear insoluble films were obtained.

Example III

To test the curing action of the polymeric butyl ortho titanate, portions of the coating compositions of Examples I and II, along with a similar composition made from an unmodified butylated methylol melamine, were treated at 100° C. The tendency to cure was determined by noting the viscosity increase of the composition. The unmodified butylated methylol melamine was unchanged after one hour. The viscosity of the composition of Example I increased rapidly and a solid gel was obtained in about 20 minutes. The viscosity of the composition of Example II which contained less of the polymeric tetrabutyl ortho titanate increased more slowly than that of Example I and the solid gel was not obtained until 40 minutes had elapsed.

Example IV

A 50% solids solution containing equal parts of a soluble fusible butylated urea-formaldehyde condensation product and polymeric tetraethyl ortho titanate was compared for curing tendencies and as a coating composition with a similar solution containing only the urea-formaldehyde condensation product. The unmodified urea resin solution did not change in viscosity on heating at 100° C. The modified resin solution became a solid gel within 10 minutes at 100° C. Films were cast on steel panels and cured at about 105° C. The modified films were insoluble and infusible. The unmodified films were infusible but they were soluble in benzene.

Example V

A coating composition containing 50% solids by weight was prepared from 100 parts of a soluble, fusible butylated urea-formaldehyde resin and 25 parts of polymeric tetraethyl ortho titanate. The solvent was a 50-50 mixture of butanol and xylol. Films were cast on steel panels and cured at 105° C. The cured films were hard, clear, insoluble and infusible.

Example VI

An adhesive composition was prepared by dissolving 100 parts of a melamine-formaldehyde soluble fusible condensation product in a mixture of xylol and butanol. To the solution was added 5 parts of polymeric tetrabutyl ortho titanate and sufficient fibrous filler to yield a composition of thin pastelike consistency. The adhesive was used to laminate kraft paper using a pressure of about 20 p. s. i. and a temperature of about 105° C. during the laminating operation. A firm insoluble moisture impervious bond was obtained.

*Example VII*

A quick-setting adhesive was prepared by adding one part of a solid polymer of titanium tetraphthalate to a 50% solids solution comprising 100 parts of the methyl ether of hexamethylol melamine dissolved in a 50-50 mixture of anhydrous methanol and xylol. The adhesive could be used to cement like or unlike surfaces including wood, metal, paper, fabrics, synthetic resins, etc. by applying a coating of the adhesive to the surfaces to be joined, placing the two coated surfaces together and then heating the laminate at from 50° C. to 150° C. for from 2 to 5 minutes while maintaining a small amount of pressure on the laminate. The resultant bond is insoluble, infusible and impervious to water. This adhesive is quite sensitive to heat and moisture before it is cured so that the solid polymeric titanium tetraphthalate should not be dissolved in the melamine ether solution until the adhesive is to be used.

*Example VIII*

An adhesive which was quite stable at normal temperature conditions but which cured at a much slower rate was prepared by substituting a polymer of the tetrabutyl amide of ortho titanic acid for the titanium tetraphthalate polymer of Example VII. The curing time at from 50° C. to 150° C. ranged from about one hour at the lower temperature to about ten minutes at 150° C.

Potting compositions may also be prepared from the compositions of this invention by using less organic solvent so that the compositions contain from 75% to 90% solids by weight. Such compositions cure quickly at relatively low temperatures to solid infusible gels.

The aminoplasts of this invention are condensation products of aldehydes with amino compounds containing at least two active hydrogens attached to nitrogen. Among the more commonly used amino compounds are urea, thiourea, dicyandiamide, guanidines, aminotriazines such as melamine, trialkyl melamines, triaryl melamines and such deamination productions thereof which still contain at least two active hydrogen atoms attached to nitrogen. Mixtures of the amino compounds may be used, mixtures of urea and melamine being particularly satisfactory.

Formaldehyde is the aldehyde usually used to prepare the initial condensation products of this invention since it is the most practical from the standpoint of availability and price. However, other aldehydes such as acetaldehyde, butyraldehyde, octaldehyde, including 2-ethyl hexaldehyde, may be used.

For the purposes of this invention the aminoplasts should be in the form of partial condensation products which are still soluble in organic solvents and still fusible. Various methods for preparing such products are known which consist mainly of stopping the condensation reaction at a predetermined point by neutralizing the condensation catalyst, cooling the reaction mixture, etc.

For many applications, it is desirable to modify the aminoplasts by reacting them with an alcohol, phenol or amide. The modified condensation products have varied properties which make them useful in specialized compositions. Especially important are the alcohol modified aminoplasts variously designated as alkylated aminoplasts or aminoplast ethers. These condensation products are made by reacting the amino compound with the aldehyde and the alcohol under acid conditions. The three ingredients may be mixed together and then reacted or the amino compound and the aldehyde may be precondensed and the condensation product then reacted with the alcohol in the presence of acidic materials.

The polymeric organo titanates of this invention are new polymers which are disclosed and claimed in my copending application Serial No. 122,844 filed October 21, 1949. They are prepared by heating monomeric organic derivatives of titanium with limited amounts of water. By varying the amount of water within the limits of 0.5 to 1.5 mols per mol of titanium monomer, the extent of the polymerization may be controlled. These polymeric materials may be polymers of esters, mixed anhydrides or amides of orthotitanic acid.

Included among the polymeric titanium derivatives are polymers of esters of ortho titanic acid such as the methyl, ethyl, butyl, isobutyl, octyl, lauryl, stearyl, oleyl, benzyl, cinnamyl, esters. Aryl esters such as phenyl, naphthyl and substituted phenyl or naphthyl esters may also be used. The ester groups may contain various substituents such as halogen, nitro groups, amino groups, and the aryl esters may contain alkyl substituents. The mixed anhydrides may be derived from aliphatic or aromatic organic acids which also may contain various substituents such as halogen, nitro, amino, amido, and in the case of aromatic acids, alkyl groups. Examples of the mixed anhydrides are the polymers of the titanium tetra-acetate, tetra-propionate, tetrabutyrate, tetrastearate, tetraphthalate, tetrachloracetate, tetranitrophthalate, etc. The polymeric amides may be derived from the alkyl or aryl or substituted alkyl or aryl amides of ortho titanic acid including the methyl, ethyl, butyl, isobutyl, t-butyl, decyl, aniline, etc. amides of ortho titanic acid.

The polymeric organotitanium compounds are compatible with the aminoplasts of this invention in ratios up to 100 parts of polymer per 100 parts of soluble condensation product. The amount to be added will depend on the end use to which the composition is to be put, on the particular amino condensation product and on the particular organotitanium polymer. Thus, for extremely rapid curing, fairly large amounts of polymeric carboxylic acid anhydrides of ortho titanic acid should be used and for retarded curing the titanium derivatives should be one of the amido polymers of titanium. For general use the polymeric ortho titanic acid esters are the most economical and easiest to prepare. The rate of cure and the storage stability of the compositions containing these polymers will depend on the amount of the polymer present, other conditions being maintained constant. Thus, if 5 parts of a polymeric butyl ortho titanate are used, the composition will have a relatively long storage life and an average cure rate at normal curing temperatures. If 100 parts of the butyl ortho titanate are used, the storage life will be reduced somewhat although it will still be sufficient for most purposes and the curing time will be extremely short at the normal curing temperatures of 100–150° C.

The compositions of this invention may be modified by any of the conventional additives normally used in coating adhesive and fabric treating fields including dyes, pigments, fillers, natural and synthetic resins, etc.

The compositions of this invention are preferably used in the form of organic solvent solutions containing substantially no water. Among the solvents which may be used are ketones such as methyl isobutyl ketone, substantially anhydrous alcohols such as ethanol and butanol, mineral spirits, solvent naphthas, xylol, toluol, benzol, etc. Certain esters and ether esters may be used such as Cellosolves, butyl acetate, amyl acetate, etc. Combinations of solvents may be used among which a combination of butanol and xylol is the most practical for economic reasons.

The compositions may also be used in the form of dry mixtures of a dried fusible and soluble aminoplast with the organo titanium polymers. Care must be taken in blending the dried resin with the titanium polymer to see that no substantial amount of moisture is included and that the temperature remains fairly low, i. e., about 20–40° C., during the blending operation. The dry mixes may be used as adhesives by mixing them with water immediately before use as an adhesive or by dissolving them in organic solvents. If water is used, the setting or curing reaction is very rapid whereas when organic solvents are used the curing reaction is slower and can be more easily controlled.

The dry blends may also be used as molding powders since at normal molding temperatures the interaction between the titanium polymer and the aminoplast is rapid and complete. However, it is not possible to subject the dry blends to hot milling operations or other conventional preliminary mechanical working such as extrusion prior to the molding operation since the resins would be cured during the mechanical working and molding would be impossible.

The compositions of this invention are particularly advantageous for use in coatings, adhesives, and textile treating compositions since they have a relatively long storage life and yet may be cured rapidly at low temperatures. Furthermore, the cured compositions do not contain any added haze due to the polymeric titanium compounds and except in the case of the mixed anhydrides, no acidic decomposition products are obtained in the curing action. This latter feature is especially advantageous in treatment of fabrics.

It is obvious that many variations may be made in the products and processes of this invention without departing from the spirit and scope thereof as defined in the appended claims.

What is claimed is:

1. A thermosetting composition as in claim 7 wherein the amino compound is melamine.
2. A thermosetting composition as in claim 7 wherein the amino compound is urea.
3. A thermosetting composition as in claim 7 wherein the aldehyde is formaldehyde.
4. A thermosetting composition as in claim 7 wherein the titanium polymer is a polymer of an ester of ortho titanic acid.
5. A composition as in claim 7 wherein the titanium polymer is a polymer of an amide of ortho titanic acid.
6. A composition as in claim 7 wherein the titanium polymer is a polymer of a mixed anhydride of a carboxylic acid and ortho titanic acid.
7. A thermosetting composition comprising a mixture of a polymeric tetraorgano derivative of titanium and a soluble, fusible condensation product of an aldehyde and an aldehyde reactable amino compound containing at least two active hydrogen atoms attached to nitrogen, said polymeric tetraorgano derivative of titanium having been obtained by reacting 0.5 to 1.5 mols of water with 1 mol of an organic titanium compound taken from the group consisting of the esters, mixed anhydrides and amides of ortho titanic acid, said esters having the formula $Ti(OR)_4$ wherein R is taken from the group consisting of alkyl, aryl, aralkyl, alkenyl and aralkenyl radicals, said anhydrides having the formula

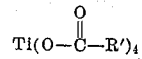

wherein R' is taken from the group consisting of alkyl and aryl radicals and said amides having the formula

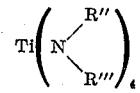

wherein R'' is taken from the group consisting of hydrogen and alkyl and aryl radicals and R''' is taken from the group consisting of alkyl and aryl radicals.

8. A coating composition comprising a substantially water-free organic solvent solution of a polymeric tetraorgano derivative of titanium and a soluble, fusible condensation product of an aldehyde and an aldehyde reactable amino compound containing at least two active hydrogen atoms attached to nitrogen, said polymeric tetraorgano derivative of titanium having been obtained by reacting 0.5 to 1.5 mols of water with 1 mol of an organic titanium compound taken from the group consisting of the esters, mixed anhydrides and amides of ortho titanic acid, said esters having the formula $Ti(OR)_4$ wherein R is taken from the group consisting of alkyl, aryl, aralkyl, alkenyl and aralkenyl radicals, said anhydrides having the formula

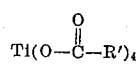

wherein R' is taken from the group consisting of alkyl and aryl radicals and said amides having the formula

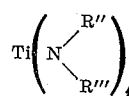

wherein R'' is taken from the group consisting of hydrogen and alkyl and aryl radicals and R''' is taken from the group consisting of alkyl and aryl radicals.

9. An insoluble, infusible compound comprising the heat reaction product of a polymeric tetraorgano derivative of titanium and a fusible condensation product of an aldehyde and an aldehyde reactable amino compound containing at least two active hydrogen atoms attached to nitrogen, said polymeric tetraorgano derivative of titanium having been obtained by reacting 0.5 to 1.5 mols of water with 1 mol of an organic titanium compound taken from the group consisting of the esters, mixed anhydrides and amides of ortho titanic acid, said esters having the formula $Ti(OR)_4$ wherein R is taken from the group consisting of alkyl, aryl, aralkyl, alkenyl and aralkenyl radicals, said anhydrides having the formula

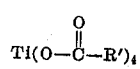

wherein R′ is taken from the group consisting of alkyl and aryl radicals and said amides having the formula

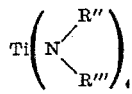

wherein R″ is taken from the group consisting of hydrogen and alkyl and aryl radicals and R‴ is taken from the group consisting of alkyl and aryl radicals.

THOMAS BOYD.

References Cited in the file of this patent

UNITED STATES PATENTS

| Number | Name | Date |
|---|---|---|
| 2,058,394 | Arvin | Oct. 27, 1936 |
| 2,058,844 | Vaughn | Oct. 27, 1936 |
| 2,320,816 | D'Alelio | June 1, 1943 |
| 2,541,896 | Vasileff | Feb. 13, 1951 |

FOREIGN PATENTS

| Number | Country | Date |
|---|---|---|
| 125,450 | Australia | Sept. 25, 1947 |